(12) United States Patent
Fino et al.

(10) Patent No.: US 11,883,978 B2
(45) Date of Patent: Jan. 30, 2024

(54) IN SITU SYNTHESIS, DENSIFICATION AND SHAPING OF NON-OXIDE CERAMICS BY VACUUM ADDITIVE MANUFACTURING TECHNOLOGIES

(71) Applicant: POLITECNICO DI TORINO, Turin (IT)

(72) Inventors: Paolo Fino, Turin (IT); Laura Montanaro, Turin (IT); Mariangela Lombardi, Turin (IT); Sara Biamino, Asti (IT); Abdollah Saboori, Turin (IT)

(73) Assignee: POLITECNICO DI TORINO, Turin (IT)

( * ) Notice: Subject to any disclaimer, the term of this patent is extended or adjusted under 35 U.S.C. 154(b) by 481 days.

(21) Appl. No.: 17/256,753

(22) PCT Filed: Jul. 4, 2019

(86) PCT No.: PCT/IB2019/055720
§ 371 (c)(1),
(2) Date: Dec. 29, 2020

(87) PCT Pub. No.: WO2020/008410
PCT Pub. Date: Jan. 9, 2020

(65) Prior Publication Data
US 2021/0283801 A1    Sep. 16, 2021

(30) Foreign Application Priority Data
Jul. 4, 2018    (IT) .................. 102018000006916

(51) Int. Cl.
*B32B 1/00*    (2006.01)
*B33Y 10/00*    (2015.01)
(Continued)

(52) U.S. Cl.
CPC ............ *B28B 1/001* (2013.01); *B28B 11/243* (2013.01); *B33Y 10/00* (2014.12); *B33Y 40/10* (2020.01);
(Continued)

(58) Field of Classification Search
CPC ...................................................... B28B 1/001
See application file for complete search history.

(56) References Cited

U.S. PATENT DOCUMENTS

| 2014/0311111 | A1 | 10/2014 | Wolff et al. |
| 2016/0083303 | A1 | 3/2016 | Mironets et al. |

(Continued)

FOREIGN PATENT DOCUMENTS

| WO | 02/055451 A1 | 7/2002 |
| WO | 2015/012911 A2 | 1/2015 |

(Continued)

OTHER PUBLICATIONS

Morancais et al., "High porosity SiC ceramics prepared via a process involving an SHS stage", Journal of the European Ceramic Society, Oct. 1, 2003, vol. 23, No. 11, pp. 1949-1956.

(Continued)

*Primary Examiner* — Ian A Rummel
(74) *Attorney, Agent, or Firm* — NIXON & VANDERHYE

(57) ABSTRACT

A vacuum additive manufacturing process enabling obtaining, through a single-step process, the synthesis, controlled densification and shaping of non-oxide materials as well as (Continued)

composite materials containing non-oxide as matrices or reinforcements, in porous as well as fully dense ceramic components, with a tailored nano-micro-macrostructure.

20 Claims, 1 Drawing Sheet

(51) Int. Cl.
| | |
|---|---|
| *B33Y 40/10* | (2020.01) |
| *B33Y 40/20* | (2020.01) |
| *B33Y 80/00* | (2015.01) |
| *B28B 11/24* | (2006.01) |
| *C04B 35/80* | (2006.01) |
| *C04B 35/573* | (2006.01) |
| *C04B 35/653* | (2006.01) |
| *C04B 35/65* | (2006.01) |
| *B28B 1/00* | (2006.01) |

(52) U.S. Cl.
CPC ............... *B33Y 40/20* (2020.01); *B33Y 80/00* (2014.12); *C04B 35/573* (2013.01); *C04B 35/652* (2013.01); *C04B 35/653* (2013.01); *C04B 35/80* (2013.01); *C04B 2235/3826* (2013.01); *C04B 2235/425* (2013.01); *C04B 2235/428* (2013.01); *C04B 2235/528* (2013.01); *C04B 2235/5436* (2013.01); *C04B 2235/6026* (2013.01); *C04B 2235/6581* (2013.01); *C04B 2235/661* (2013.01); *C04B 2235/665* (2013.01)

(56) References Cited

U.S. PATENT DOCUMENTS

| | | |
|---|---|---|
| 2017/0008236 A1 | 1/2017 | Easter et al. |
| 2017/0137327 A1 | 5/2017 | Capobianco et al. |

FOREIGN PATENT DOCUMENTS

| | | |
|---|---|---|
| WO | 2016/191162 | 12/2016 |
| WO | 2017/089494 | 6/2017 |
| WO | 2017/132668 | 8/2017 |

OTHER PUBLICATIONS

Gonzalez et al., "Characterization of ceramic components fabricated using binder jetting additive manufacturing technology", Ceramics International, Jul. 2016, vol. 42, No. 9, 14 pages.

Bertrand et al., "Ceramic components manufacturing by selective laser sintering", Applied Surface Science, Dec. 15, 2007, vol. 254, No. 4, pp. 989-992.

Yves-Christian et al., "Net Shaped High Performance Oxide Ceramic Parts by Selective Laser Melting", Physics Procedia, 2010, vol. 6, Part B, pp. 587-594.

Deckers et al., "Direct selective laser sintering/melting of high density alumina powder layers at elevated temperatures", Physics Procedia, 2014, vol. 56, pp. 117-124.

Wilkes et al., "Additive manufacturing of ZrO2-Al2O3 ceramic components by selective laser melting", Rapid Prototyping Journal, 2013, vol. 19, No. 1, pp. 51-57 (8 Total pages).

International Search Report and Written Opinion of the ISA for PCT/IB2019/055720 dated Oct. 14, 2019, 13 pages.

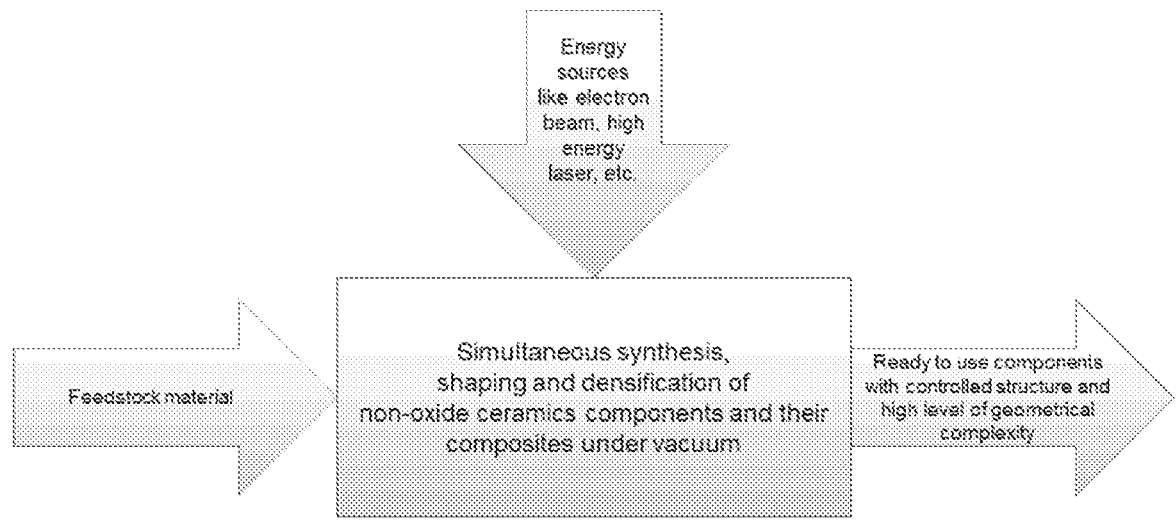

IN SITU SYNTHESIS, DENSIFICATION AND SHAPING OF NON-OXIDE CERAMICS BY VACUUM ADDITIVE MANUFACTURING TECHNOLOGIES

This application is the U.S. national phase of International Application No. PCT/IB2019/055720 filed Jul. 4, 2019 which designated the U.S. and claims priority to IT Patent Application No. 102018000006916 filed Jul. 4, 2018, the entire contents of each of which are hereby incorporated by reference.

TECHNICAL FIELD OF THE INVENTION

This invention relates to additive manufacturing process of advanced ceramics, and in particular to a process in order to perform in situ synthesis, densification at a controlled rate and shaping of non-oxide ceramics components by using a vacuum additive manufacturing technology.

BACKGROUND OF THE INVENTION

Ceramic material and components have very interesting characteristics. The covalent or ionic-covalent bonds that are binding the atoms of these materials, are extremely strong, consequently they have a high refractoriness and chemical inertness, a high stiffness and a notable hardness, properties maintained even at temperatures above 1000° C., thereby their potential for technological applications in the sectors of energy conversion devices, mechanical machining, aerospace, automotive, etc. derives. Due to the high melting points of ceramics, it is not possible to produce ceramics components through technologies such as the casting of molten material. Ceramic components are produced by compacting of powders (shaping them to the final desired form of the component) and solid-state sintering (i.e. by consolidating the powders).

Sintering is a high-temperature heat treatment that transforms the inorganic material (green body) that will make up the ceramic in a monolithic material and therefore characterized by desired mechanical properties.

The same chemical bonds imparting such interesting characteristics are, however, also responsible for their brittleness as they do not allow the crystalline planes to slip with respect to each other and therefore do not allow the material to deform plastically. Therefore, to increase the resistance of the ceramic material (mainly in terms of fracture toughness), it is necessary to intervene on the matrix modifying its microstructure by inserting new phases or optimizing the ceramic material production process and the surface finishing. Generally, for the polymer and metal matrix compounds the reinforcing phase is inserted in the matrix by bringing the matrix to the liquid or fluid state and mixing with the reinforcing phase, so during cross-linking or solidifying the reinforcing phase stay inside the material influencing the matrix mechanical properties. Anyway, as anticipated above, in the case of ceramic composites the matrix cannot be brought to the molten state because, or it decomposes or the melting temperatures are so high that it reacts with the toughening phase, in addition to technological difficulties related to the handling of liquid phases with temperatures that in some cases can even reach 2000° C. So the most common way to densify a ceramic matrix is the sintering process as mentioned above.

The ceramic composites differ in the fact of using oxide or non-oxide matrices. In oxide ceramics, such as aluminium oxide-based ceramics and zirconium oxide-based ceramics particles are held together by ionic bonding. Aluminium oxide-based ceramics have good mechanical properties, but their main advantage is their resistance to wear and oxidation, while their creep resistance characteristics are limited. Their toughness and thermal conductivity are low. Their main applications are in the field of cutting tools and anti-wear elements, in sealing washers on fittings and crushing mills (balls), precision-grinding tools, cutting plates and insulating parts.

Non-oxide ceramics exhibit covalent bonds and include carbides, borides, nitrides, thus silicides and others including materials like silicon carbide, boron carbide, silicon nitride, aluminium nitride, boron nitride, etc . . . .

Thanks to their superior hardness, thermal and mechanical properties even at very high operative temperatures, high corrosion resistance, their applications range from superhard abrasives ($B_4C$, BN) and cutting tools (WC), to rocket nozzles ($TiB_2$), electrodes for metal melts ($ZrB_2$) and heating elements ($MoSi_2$). The most important structural non-oxide ceramics are Silicon Carbide (SiC), Silicon Nitride ($Si_3N_4$) and the so-called SiAlONs, nitride-based ceramics with varying oxide contents. The application of solid-state sintering to non-oxide ceramics, like the ones mentioned above, is furthermore complicated because their strong and predominantly covalent atomic bonds inhibit solid-state diffusion below their decomposition temperature (approx. 2500° C. for SiC, 1900° C. for $Si_3N_4$) thus requiring extremely high process temperature.

A second aspect, which makes solid-state sintering a difficult process, is related to the necessity for non-oxides to perform the process in reducing or inert atmosphere to prevent their oxidation. More typically the sintering procedure requires the introduction of some additional driving forces to foster the process such as the use of high pressure or the addition of sintering aids. So the Hot-Pressing (HP) and Hot-Isostatic Pressing (HIP), Liquid-Phase Sintering (LPS) or Reaction-Bonding (RB) techniques are therefore extensively used for densification. In all cases, non-oxide ceramics must undergo high-temperature processing in reducing or inert atmosphere to prevent their oxidation. For instance, the so-called HP—SN ($Si_3N_4$) is densified by hot pressing at 15-30 MPa in graphite dies inductively heated under nitrogen atmosphere up to 1550-1800° C. for 1-4 h. Hot pressing is facilitated by adding 2-3 vol. % of oxides (e.g. MgO, $Al_2O_3$, $Y_2O_3$), which form a low melting silicate or Si—O—N liquid at high temperatures, which solidifies on cooling to give a glass, bonding the $Si_3N_4$ grains, sometimes with the simultaneous $Si_2N_2O$ formation. A greater liquid content produces a less porous body, but promotes brittle behaviour and limits the high temperature mechanical properties. Pressure-less sintered $Si_3N_4$ (S—SN) needs an even larger amount of additives (7-15 vol. %). Hot isostatic pressing (HIP) of $Si_3N_4$ is expensive, but has the advantage of lower additive contents and can be used for complex shapes.

In the reaction bonding process a shaped Si powder compact is made (e.g. by pressing, slip casting or injection molding) and reacted in nitrogen (several days at 1250-1450° C.).

The reaction 3 Si+2 $N_2 \rightarrow Si_3N_4$ is exothermic and must be carefully controlled (if allowed to proceed too quickly the Si would melt). Almost pure $Si_3N_4$ is produced, but the complete transformation of Si into $Si_3N_4$ is not achieved: the microstructure contains isolated Si particles in a continuous matrix of needle-like $\alpha$-$Si_3N_4$, more equiaxed $\beta$-$Si_3N_4$ and residual porosity. Since the Si-to-$Si_3N_4$ reaction is associated with a 22% volume increase, the original pores in the Si compact are partially filled with the nitride phase, so that the shrinkage during nitridation is very small (allowing near-net-shape process). A post-sintering heat treatment at 1600-1800° C. (with MgO or $Y_2O_3$) can be applied to achieve high density, but this implies a degradation of high-temperature properties. Alternatively, hot isostatic pressing can be applied.

SiAlONs are ceramic alloys based on the elements silicon (Si), aluminium (Al), oxygen (O) and nitrogen (N) developed in the 1970s to solve the problem of silicon nitride ($Si_3N_4$) being difficult to fabricate. They can be produced by reaction-sintering (1750-1850° C.) or hot pressing (1500-1850° C. and 15-20 MPa) from $Si_3N_4$, $Al_2O_3$, AlN and $Y_2O_3$. During hot pressing, SiAlONs undergo a similar solution-precipitation mechanism as $Si_3N_4$ so that $\alpha$-$Si_3N_4$ converts to elongated $\beta$-sialon grains.

The vapour pressure of $\beta$-SiAlON (solid solution) is lower than that of $\beta$-$Si_3N_4$ (solvent), leading to the appearance of more liquid at a lower temperature. Moreover, Al lowers the eutectic temperature. Control of the liquid volume allows the material to be densified by pressure-less reaction-sintering at a lower temperature, leading to a certain inhibition of the grain growth; the consequent small mean grain size assures quite high strength. SiAlONs are more stable than $\beta$-$Si_3N_4$ (lower vapour pressure reduces volatilization and decomposition). In contrast to $Si_3N_4$ there is a silica-rich liquid at 1800° C. (as stated by the phase diagram $Si_3N_4$—$SiO_2$—$Al_2O_3$—AlN); so, the in-situ liquid phase sintering aid is generated without liquid-forming additives. As a consequence, it is possible to achieve the formation of $\beta$-SiAlONs from powder mixtures and the densification via the high-temperature liquid; subsequent reactions should eliminate this liquid (therefore, via a transient liquid phase sintering), finally leaving a purely crystalline material.

Since sintering and reactions are slow, due to the high viscosity of the SiAlON liquid phase, other oxides are added which form less viscous and more reactive liquids, for instance, $Y_2O_3$ (it forms a liquid at 1325° C., promotes the formation of $\alpha$-SiAlONs, but leaves a residual glass, limiting the high-temperature properties).

Reaction-bonded silicon carbide, also known as siliconized silicon carbide or SiSiC, is a type of silicon carbide that is manufactured by a chemical reaction between porous carbon or graphite with molten silicon. If pure silicon carbide is produced by sintering of silicon carbide powder, it usually contains traces of chemicals called sintering aids, which are added to support the sintering process by allowing lower sintering temperatures. This type of silicon carbide is often referred to as sintered silicon carbide or abbreviated to SSiC. Reaction-bonded SiC (RB—SiC) is formed by bonding SiC and C powder with further SiC produced in situ by chemical reaction between Si (liquid or vapour) and C (e.g. by graphite flakes and polymer binder). The $\alpha$-SiC powder compacts can be shaped, e.g. by plastic forming (extrusion or injection moulding), and subsequently heated to remove the binder and pyrolyze the polymer. The resulting porous compact is then infiltrated with Si and heated in a radio frequency furnace at temperatures>1500° C. under vacuum or inert atmosphere. Liquid Si penetrates the porous body by capillary action. Processing can be controlled to give relatively pure, but porous, SiC or a dense microstructure with 10-40 vol. % free Si in a SiC matrix. In the latter case, the weak SiC—Si boundaries control the mechanical strength, which is 350-550 MPa at room temperature but exhibits a steep decrease at 1400° C., that is at the softening point of Si. Until the 1970s it was widely assumed that due to its strong, covalent bonding (inducing a high activation energy for diffusion) SiC could not be pressure-less sintered. However, Prochazka showed in 1973 that submicron SiC powder ($\beta$-SiC made by vapour phase routes) could be densified in inert gas or vacuum atmosphere at 1950-2100° C. with small additions of B and C without added pressure. Later, the same was done with Acheson $\alpha$-SiC powders. Thus, a low-cost route was available to pressure-less or self-sintered SiC (S—SiC), a strong material which retained its strength at high temperatures (due to the absence of the weakening grain boundary phase).

This ceramic also exhibits excellent corrosion resistance, both to acid and alkaline media and it does not contain free carbon or graphite. The role of B and C in pressure-less sintering of SiC is not fully understood, but it is a solid state sintering mechanism. Singly doped (Al or B) $\alpha$-SiC powders undergo excessive grain growth, leading to a low strength (large anisometric grains acting as flaws), while double doping (Al and B) leads to homogeneous, fine-grained microstructures. When $\beta$-SiC starting powders are used, coarsening (and excessive grain growth) is associated with the transformation from $\beta$- to $\alpha$-SiC (small grains tend to be $\beta$, large $\alpha$). Excessive grain growth and transformation can be prevented by annealing (1650-1850° C., 1 h).

Different techniques were largely investigated for producing porous SiC materials: for instance, Morancais et al. disclose a multi-step process starting from stechiometric mixtures of silicon and graphite, using firstly uniaxial compaction (shaping) and then the thermal treatment at high temperature in Ar, with a weak voltage (sintering).

According to the ISO/ASTM 17296 standard on Additive Manufacturing (AM) Technologies, Additive Manufacturing is the "process of joining materials to make objects from three-dimensional (3D) model data, usually layer by layer, as opposed to subtractive manufacturing and formative manufacturing methodologies". Seven types of AM processes can be differentiated: material jetting, material extrusion, directed energy deposition, sheet lamination, binder jetting, powder bed fusion and vat photopolymerization, all applicable to shape ceramic components, starting from usually submicrometer-sized ceramic powder particles. Basically two different types of AM process can be identified: (i) the single step processes, also called 'direct' processes, wherein parts are fabricated in a single operation where the basic geometrical shape and basic material properties of the intended product are achieved simultaneously and (ii) the multi-step processes, also called 'indirect' processes, wherein the parts are fabricated in two or more operations where the first typically provides the basic geometric shape and the following consolidates the part to the intended basic material properties. Most of the AM processes to shape ceramics are multi-step (indirect) processes, making use of a sacrificial binder material to shape ceramic powder particles, which is usually removed in a subsequent 'debinding' furnace treatment.

The only single-step processes to shape ceramics are direct energy deposition and single-step powder bed fusion. The latter process comprises Selective Laser Melting (SLM®), single-step Selective Laser Sintering ('direct' SLS®, in contrast to 'indirect SLS') and Electron Beam Melting (EBM®). Powder bed fusion processes are defined as "additive manufacturing process in which thermal energy selectively fuses regions of a powder bed". During powder bed fusion, different consolidation phenomena, i.e. binding mechanisms, can be distinguished. Generally, the thermal energy irradiating the powder particles comes from a laser beam (Selective Laser Melting, SLM; Selective Laser Sintering, SLS) or an electron beam (Electron Beam Melting, EBM). The thermal energy irradiating the powder particles can initiate either full melting of the powder particles, partial melting of the powder particles, solid-state sintering of the powder, a chemical reaction of the powder particles, or a gelation reaction (i.e. the formation of a three-dimensional network that entraps the powder particles). If the powder is fully melted by a laser beam, the process can be categorized as Selective Laser Melting (SLM). All other laser-based powder bed fusion processes can be categorized as Selective Laser Sintering (SLS). If the powder is fully melted by an Electron Beam, the process can be categorized as Electron Beam Melting (EBM).

Wilkes J. has experimentally investigated the selective laser melting of oxide ceramics material, like zirconia and alumina. The followed up approach was to completely melt $ZrO_2/Al_2O_3$ powder mixtures by a focused laser beam. In order to reduce thermally induced stresses, the ceramic was preheated to a temperature of at least 1600° C. during the build-up process [Wilkes J. "Additive manufacturing of $ZrO_2$—$Al_2O_3$ ceramic components by selective laser melting", Rapid Prototyping Journal, (2012) 19: 51-57].

Gonzales J. A. et al. described a binder jetting additive manufacturing technology used to produce ceramics components from oxide ceramics (alumina). Various building parameters (e.g. layer thickness, saturation, particle size) were modified and different sintering profiles were investigated to achieve nearly full-density parts (~96%). The material microstructure and physical properties were also characterized. [Gonzalez J. A. et al., "Characterization of ceramic components fabricated using binder jetting additive manufacturing technology, Ceramics International (2016) 42: 10559-10564].

Bertrand P. et al. have applied the technology of selective laser sintering/melting to manufacture net shaped objects from pure oxide ceramics used as starting materials (yttria-zirconia powders). Experiments were carried out on Phenix Systems PM 100 machine with 50 W fibre laser [Bertrand P. et al., Ceramic components manufacturing by selective laser sintering, Applied Surface Science (2007) 254: 989-992].

Selective Laser Melting (SLM) was used in the manufacturing process described by Yves-Christian H. et al. using pure oxide ceramics (alumina and zirconia) as starting material, wherein pure ceramics powder is completely melted by a laser beam yielding net-shaped specimens of almost 100% densities without any post-processing [Yves-Christian H. et al., "Net Shaped High-Performance Oxide Ceramic Parts by Selective Laser Melting" Physics Procedia (2010) 5: 587-594].

A method based on the combination of Selective Laser Sintering and post-processing steps, such as silicon infiltration, to create a process for rapidly making Si/SiC parts directly from a CAD database is disclosed in the International Patent Application WO 2002/055451. The fabrication method of this invention is a quite long multi-step process comprising mixing a binder with silicon carbide (SiC) to form a SiC-binder mixture and subjecting the SiC mixture to a SLS process to form a sintered SiC part. The sintered SiC part is cleaned, subjected to siliconization and cooled down. Siliconization forms a silicon/silicon carbide (Si/SiC) part.

High density powder layers deposition through electrophoretic deposition (EPD) of a ceramic slurry (colloid) has been described by Deckers J. et al. In this work high preheating temperatures (800° C.) are combined with direct SLS/SLM to rapidly produce three-dimensional alumina parts. The electrophoretic deposition process was used to form a highly dense powder layer on a cylindrical deposition electrode starting from high pure oxide ceramic (alumina), a post-sintering step has been done on the SLS/SLM'ed ceramics. The EPD layer deposition combined with high preheating temperatures ensured that only a small laser energy density was necessary to fuse the alumina [Deckers J. et al., "Direct selective laser sintering/melting of high density alumina powder layers at elevated temperatures". Physics Procedia (2014) 56: 117-124]

US patent application US 2017/0008236 describes additive manufacturing for 3D printing of advanced ceramics. According to this invention the precursor resin beads are blended with a powder selected from at least one of a metal powder, a carbide powder, a ceramic powder and a mixture thereof; thereafter, a multitude of layers of the polymer precursor resin and powder blend is deposited in a bed; each layer containing photocurable or thermally curable resins is sprayed; afterwards, the layers and the entire bead bed is heated under ultraviolet or infrared radiation to cure the resin mixture and form a finished green body component; and the finished green body component is transferred to a furnace to convert the green body to a ceramic composite having a thickness in a depth dimension in a range between approximately 200 microns and approximately 25 millimeters (mm). Therefore, the process requires the mixing of starting powder with resin beads, a curing step and further sintering.

The international patent application WO 2015/012911 relates to additive manufacturing of ceramic turbine components by transient liquid phase bonding using metal or ceramic binders. This invention is generally based on a method of forming a component including the preparation of a starting powder by mixing a ceramic powder with an inorganic binder powder, forming the mixed powder into a component by an additive manufacturing process, and densifying the component by transient liquid phase sintering. The skilled person can easily understand that the use of low melting inorganic binder considerably limits the maximum operative temperature of the obtained material.

Sol containing nanosized particles used for producing ceramic components by additive manufacturing process is described in the International Patent Application WO 2016/191162. In particular, the present invention relates to a multi-step stereolithography process for producing a ceramic component, the process comprising the steps of providing a printing sol, the printing sol comprising a solvent, nano-sized particles, radiation curable monomer(s) and photoinitiator.

The US patent application No. 2017/0137327 discloses a method for additive manufacturing involving the deposition of a substantially uniform layer of raw material onto a substrate. The raw material can include ceramic particles and should be coated with at least one metal or polymer. The method can include selectively melting particles of the raw material to form a first layer of the component, clearing non-fused particles of the raw material from the first layer of the object and repeating the same procedure several times till the completion of the components.

Therefore, according to the extensive available bibliography Electron Beam Processes (i.e. Electron Beam Melting, EBM) have only been investigated for metal-matrix composites and not for pure ceramic materials, additive manufacturing technologies have been applied only to oxide ceramics, whereas non-oxide ceramic components can be produced by Pressureless sintering, Hot pressing, Hot isostatic pressing and Reaction-bonding techniques.

Currently, non-oxide materials are obtained by AM technologies, starting from preceramic polymers. Preceramic polymers are a special class of inorganic polymers that can convert with a high yield into ceramic materials, or polymer-derived ceramics (PDCs), via high-temperature treatment in inert or oxidative atmospheres. The polymer-to-ceramic conversion occurs with the gas release and shrinkage at 400-800° C. The most frequently used preceramic polymers contain silicon atoms in the backbone (e.g., polysiloxanes, polysilazanes, and polycarbosilanes), yielding SiOC, SiCN, or SiC ceramics after pyrolysis. However, aluminium- and boron-containing polymers also are possible. A large shrinkage (up to 70% linear, depending on molecular architecture and ceramic yield of the polymer) can be experienced during the polymer-to-ceramic conversion to achieve densified parts and the achievement of full densification is still a challenge.

The US patent application 2014/0311111 discloses a process for preparing silicon emulsions through suspension polymerization techniques which involves combining an emulsifier, a silanol functional organopolysiloxane, a polymerization catalyst and water to form a mixture.

The patent WO 2017/089494 describes a multi-step process for 3D printing of a ceramic component in which a liquid binder is selectively dropped on the deposited powder layer and cured. This process continues layer wise to achieve a green body having desire shape. Thereafter, carbonising the green body, and siliconising the carbonised green body by infiltration with liquid silicon is carried out to achieve the final component.

Therefore, the available techniques for the production of non-oxide ceramics or ceramic matrix composite components still involve several steps, and their sintering is extremely critical thus limiting the complexity of the shape of the resulting components; difficulties in producing non-oxide ceramic component, particularly if the production of complex shape components is sought, remain and adversely affect the technological progress and the application potential of the products in the relative technical field.

SUMMARY OF THE INVENTION

In order to overcome limitations and drawbacks still present in the field of non-oxide ceramic component production, the present invention provides a vacuum additive manufacturing process performing in a single step the in-situ synthesis of the non-oxide material, its densification and the shaping of the desired component. The process according to the invention enables to reduce time and costs of production, to limit or avoid the drawbacks of the secondary phases (i.e. glass or oxide phases present in the final material as a consequence of the consolidation strategy adopted) mostly on the high temperature performances, and strongly improve the freedom in the design of the final components.

The object of the present invention is also the non-oxide ceramics obtainable by the vacuum additive manufacturing process performing in a single step the in-situ synthesis of the non-oxide material, its densification and the shaping of the desired component which represents a matrix of innovative high-performing ceramic-ceramic or ceramic-metal composites with tailored nano-micro-macrostructure.

The FIG. 1 is a scheme of the single step process for the simultaneous synthesis, shaping and densification of non-oxide ceramics according to the proposed invention.

DETAILED DESCRIPTION OF THE INVENTION

The present invention enables to perform in situ synthesis, densification at a controlled rate and shaping of non-oxide ceramic parts by using a vacuum additive manufacturing technology, wherein thermal energy is supplied by one or more energy sources, such as laser or electron beam, or other energy sources suitable for the aim, and focused on a powder bed, progressively deposited following 3D model data to shape the desired component. The products obtainable by the process of the invention are porous and fully dense ceramic components with a tailored nano-micro-macrostructure.

With the expression "tailored nano-micro-macrostructure" as used in the present description is meant a structure characterized by a strict control of the features, for instance, in terms of grain size and shape, phase distribution, grain boundary purity, full density or tailored porosities, in any dimensional scale, from the nano- to the macro-level. Therefore, the process of the present invention provides the ability to produce ceramic components with microstructure and texture differentiated and optimized for different zones of the component, thus improving the component performance.

The present technology can be applied to the production of non-oxide ceramic parts, such as components in pure silicon carbide, silicon nitride, boron carbide and silicides like $MoSi_2$ and $NbSi_2$ and related composites.

When the process according to the present invention is applied to the production of components in pure silicon carbide a suitable mixture of silicon and carbon powders ($Si+C \rightarrow SiC$) can be deposited and the energy beam induces in situ melting of silicon which reacts with carbon and transforms in silicon carbide, also assuring by particle rearrangement in the presence of the liquid/vapour-liquid phases and subsequent reaction the desired final composition and densification. At the same time, it is also possible to produce Si—SiC composites by the tailoring of the composition of the starting raw materials. By following the same theoretical approach, starting from a mixture of Si and $Si_3N_4$ powders could be possible to include nitride-based composite ceramics.

In case of boron carbide, boric oxide ($B_2O_3$) and graphite powders are mixed; the electron or laser beam supplies sufficient thermal energy to melt the boric oxide and to react it with the graphite to produce $B_4C$ ($2B_2O_3+7 C \rightarrow B_4C+6 CO$).

Pure materials can be therefore obtained, without any secondary phase at the grain boundaries, able to reduce mechanical performances mostly at high temperature. Low-cost raw materials can be used to produce in a single-step process high-performance parts made of non-oxide ceramics.

Some other potential examples could be as an instance:

$ZrO_2+B_2O_3+5C \rightarrow ZrB_2+5CO$

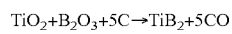

$TiO_2+B_2O_3+5C \rightarrow TiB_2+5CO$

Furthermore, these non-oxide ceramics could also represent the matrix of innovative, high performing ceramic-ceramic by simply adding the (oxide or non-oxide) second phase without its direct involvement in the synthesis reactions for matrix development. Furthermore, such procedure could also be exploited to generate in-situ non-oxide ceramics reinforcements, suitably dispersed in oxide matrices such as alumina.

Silicides like $MoSi_2$ and $NbSi_2$ and related composites are obtainable through vacuum additive manufacturing according to the present invention. Namely, powder mixtures of Si and Mo can be used to in-situ synthesize and sinter $MoSi_2$; $MoSi_2$/SiC composite materials can be in-situ synthesized using a solid state displacement reaction between $Mo_2C$ and Si as well as $MoSi_2$—$Al_2O_3$ composites can be in-situ produced by reacting a mixture consisting of $MoO_3$, Al, and Si powders.

It is now described purely by way of non-limiting example a particularly preferred embodiment of the present invention wherein silicon carbide was used as non-oxide ceramic material and vacuum additive manufacturing was performed by electron beam melting (EBM).

Electron beam melting (EBM) technique has been chosen for its ability to process brittle materials that generally cannot be processed by Laser Powder bed Fusion (LBPF). Brittle materials generally are expected to have poor thermal expansion and contraction behaviours. Indeed, by EBM it would be possible to reduce the cooling rate through the increasing of the temperature of powder bed and consequently reduce the cracks corresponding to fast solidification.

Generally, metallic particles are used as starting material in EBM. It is known that features and quality of starting powder affect the process performance. One of the key features of powders is their morphology that affects the process conditions such as flowability, powder packing and finally heat transfer process phenomena.

Previous research has established that the raw powder used in EBM must be spherical in shape.

Indeed, the spherical shape of powder affects the flowability and thus may ensure high build rates and accuracy of the component. Another important characteristic of powder for EBM is the particle size distribution, which has a significant effect on the final density, surface finish and mechanical properties. Generally, the mean powder particle size is in the range 45-150 micrometer and the external roughness of the built part is 30±5 micrometer. There are studies in which finer powders are used (5-45 micrometer), and this seems to allow to have slightly better surface roughness.

According to the CAD design of the component to be realized, this is divided into horizontal layers having thickness in the order of 30-200 micrometers; depending on the powder used the layer thickness may reach 180-200 micrometer as highest value, it is mandatory to have a powder layer thickness higher than the biggest particles.

The innovative approach used in the present invention consists in the exploiting the reaction of a metallic powder with a nonmetallic one in the equipment. Referring to SiC production, Si powder will be the metallic part and graphite, which is a crystalline allotrope of carbon, is the non-metallic one. Graphite can be added into the Si powder to react with it and form the SiC during the EBM process. The mixture of the powders must satisfy the above-described requirements: in particular, it is required the Si metallic powder satisfy the EBM requirements, supposing that the addition of graphite into the metallic powders does not affect its flowability mainly owing to the loose interlamellar coupling between sheets in the structure of graphite which results in self-lubricating properties.

Since the process is carried out in a vacuum chamber if low melting elements are present they may evaporate during the process. So in order to have the desired chemical composition in the component, it is necessary to increase the amount of these elements in the starting powder to balance the loss.

In order to uniformly mix the starting powders and decreasing the distance between the reagents and consequently increasing the efficiency of the reaction, several methods can be used. One of the high efficient methods to homogenize the feedstock materials is gas atomization, wherein graphite or oxide or non-oxide ceramic particles are mixed as filler with the metallic particles, such as Si powder, during the solidification phase. In the simplest solution, silicon powder and graphite can be mixed in the ceramic jars without media in order to preserve the spherical shape of metallic particles. Another technique that can be used as a mixing method is a wet-based technique in which at first graphite sheets are added into a liquid dispersant and dispersed using mechanical stirring or ultrasonication. Thereafter, silicon powder is added into the graphite suspension and stirred by either mechanical stirring or ultrasonication. In the end, the suspension is placed into a drying oven to vaporize the liquid dispersant and obtain the mixture of metal powder and graphite that is ready for EBM processing.

In case the resulting powder will not satisfy the above-described requirements, spray drying technique is another high efficient method that can be employed to mix the raw materials with an additional spherodizing effect. It is interesting that by using the spray drying method it is not necessary to have spherical silicon powders: during the spray drying spherical aggregates create, making possible to satisfy the flowability criteria. In addition, spray drying could also allow a more homogeneous distribution of metallic and non-metallic particles, guarantying in this way higher reaction efficiency.

According to the present invention vacuum additive manufacturing technology adopts an energy beam able to induce the in-situ synthesis and consolidating of the requested phases. In a particularly preferred embodiment of the invention wherein the additive manufacturing process is EBM, high-velocity electrons focused into a narrow beam are concentrated on a powder bed, generating heat and selectively melting the material, if low melting species are present also sublimation may occur. To collimate the electron beam the powder has to be electrically conductive. The vacuum must be used to reduce and minimize electron collisions with air molecules. According to the invention the proper vacuum level is guaranteed by a 10-4-10-5 mbar. The in situ synthesis, densification and shaping process according to the invention comprises the following procedure within a production chamber for simultaneously shaping and consolidating (see FIG. 1):

1) spreading a thin layer of silicon-graphite mixed powders on a building platform by a coater blade;
2) preheating the layer of powder, for instance by an energy source like the electron beam;
3) selective melting of the powder by an energy source, for instance by the electron beam at high energy wherein high-velocity electrons focused into a narrow beam are concentrated on a powder bed generating heat and selectively melting the powdered metallic and non-metallic particles progressively deposited, following a 3D model to shape the desired component;
4) turning (of the metallic particles) to the molten phase and reacting with non-metallic particles for synthesizing the ceramic phase;
5) repeating the sequence of steps 1-4 until the complete realization in height of the component according to the CAD design of the ceramic component to be realized.
6) post-processing.

According to the process of the invention, the final components are built up layer by layer (powder deposition, preheating, melting, and the repeating the sequence), and through the in-situ reaction between Si and graphite, a component made of SiC will be fabricated in any complex shape.

The preheating temperature can be customized depending on the material and may eventually reach 1100° C. This level of preheating determines several positive effects, namely, it partially sinters the powder on which the high energy electron beam will work thus avoiding powder balling, limiting the powder particles projection away; it allows a hot process which is beneficial to avoid the thermal shock, to which ceramics are very sensitive, thus reducing the thermal stresses; further in case a spray dried powder is used, the preheating may additionally result in debinding the binder that is used for granulation in the spray drying.

When melting, the beam works in a multi-beam way because the beam is split and heats the powder bed on several points thus producing contemporary several melting pools. This, of course, increases the process productivity as well as helps in controlling the uniformity of the temperature thus again enabling the reduction of thermal stresses.

The thermal cycle in EBM which consists of preheating, subsequent melting and solidification greatly influences the microstructure and mechanical properties of the EBM components and it is possible to optimize the movement of the electron beam spots thus changing the number of melting and remelting steps in different parts of the components enabling the possibility to tailor the resulting microstructures in different zones of the component.

Furthermore, the preheating of silicon and graphite powders with the electron beam is able to partially sinter the layer of metallic particles entrapping graphite powders among them. In this way, this preheating process will result in keeping the metal and carbon powders in place during the next melting scan. The EBM process involves a lot of process parameters, such as beam power, beam scan velocity, beam focus, beam diameter, beam line spacing, plate temperature, pre-heat temperature, contour strategies and scanning strategy. By optimizing these parameters in different parts of the desired component, it is possible to tailor the microstructure in different portions of the component. This is important because the final mechanical properties of the component can be tailored through the modification of the nano-microstructure directly during the fabrication process, through the changing of process parameters and processing strategy. On the bases of these considerations, through the variation in process parameters and processing strategy, it would be possible to build the final component made of silicon carbide either with full dense or porous structure, depending on the final application.

Post processing, i.e. the last step in the manufacturing process wherein the part receives final treatment, is an essential step in additive manufacturing technology. Indeed, post-processing step enables to improve the quality of the components and ensures that they meet their design specification. In the case of in-situ fabrication of components made of SiC, post-processing step such as thermal treatment can play a key role in the final properties of the components. In fact, a post-processing step through thermal treatment facilitates the completion of the reaction between the silicon particles and graphite sheets. Another advantage of thermal treatment is related to the modification of the microstructure, for instance, tailoring the grain size or the phase evolution, and accordingly the final properties of the component.

Therefore, according to the present description the advantages provided by the invention consists in the fact that manufacturing technologies can be exploited to obtain, through a single-step process, the synthesis, controlled densification and shaping of non-oxide materials as well as composite materials containing non-oxide as matrices or reinforcements, in porous as well as fully dense ceramic components, with a tailored nano-micro-macrostructure.

The invention claimed is:

1. A vacuum additive manufacturing process for the production of complex shape non-oxide ceramics and ceramics matrix composites with ceramic reinforcements, the process performing in a single step the in situ synthesis, controlled densification and shaping of non-oxide ceramics as mono-phase like SiC or multi-phase like complex ceramic composite materials, said process consisting in one-step reaction of powdered, electrically conductive, metallic particles with powdered non-metallic particles in a production chamber, wherein the thermal energy is supplied by one or more energy sources, a powder bed is progressively deposited and the energy source is focused on said powder bed, generating heat and selectively melting said powdered metallic and non-metallic particles following 3D model data to simultaneously shaping and consolidating the desired component.

2. The vacuum additive manufacturing process according to claim 1 applied to the production of high performance non-oxide ceramic parts, and to the generation of in situ non-oxide ceramics reinforcement dispersed in oxide matrices.

3. The vacuum additive manufacturing process according to claim 1, wherein the single step process comprises the following procedure within the production chamber for simultaneously shaping and consolidating:
   1) spreading a thin layer of metallic and non metallic mixed powders on a building platform by a coater blade;
   2) preheating the layer of powder by one or more energy sources;
   3) selective melting of the powder by one or more energy source at high energy;
   4) turning (of the metallic particles) to the molten phase and reacting with non metallic particles powder;
   5) repeating the sequence of steps 1-4 until the complete realization in height of the component according to the CAD design of the ceramic component to be realized;
   6) post-processing.

4. The vacuum additive manufacturing process according to claim 1, wherein the powder metallic particles are made of Si and the powder non metallic ones are made of graphite, oxide and non-oxide ceramic particles.

5. The vacuum additive manufacturing process according to claim 4 wherein the particles have mean particle size in the range of 5-300 micrometer.

6. The vacuum additive manufacturing process according to claim 1, wherein the metallic and non metallic mixed powders are spread on a building platform by a coater blade forming a layer having thickness higher than the biggest powder particle size and inferior of 200 micrometer.

7. The vacuum additive manufacturing process according to claim 1 wherein the vacuum level is guaranteed by a $10^{-4}$-$10^{-5}$ mbar.

8. The vacuum additive manufacturing process according to claim 1 wherein the homogenization of feedstock materials are achieved through an highly efficient method like gas atomization, wherein graphite or other oxide or non-oxide ceramic particles are mixed as filler with the metallic particles during the solidification phase.

9. The vacuum additive manufacturing process according to claim 8 wherein the metallic particles having spherical shape and non-metallic particles powders are uniformly mixed together through an highly efficient mixing method, like spray drying technique wherein graphite or other oxide or non-oxide ceramic particles are spheroidized together with the metallic particles.

10. The vacuum additive manufacturing process according to claim 1 wherein the metallic particles having spherical shape and the non-metallic powders are uniformly mixed through an highly efficient mixing method, as dry mixing in ceramic jars or by a wet-based technique wherein at first non-metallic particles sheets are added into a liquid dispersant and dispersed using mechanical stirring or ultrasonication, thereby obtaining a suspension, thereafter, the metallic particles powder is inserted into the suspension and stirred by either mechanical stirring or ultrasonication and in the end, said suspension is placed into a drying oven to vaporize said liquid dispersant and obtain the mixture of metal and non-metallic powder ready for additive manufacturing processing.

11. The vacuum additive manufacturing process according to claim 3 wherein the post-processing step is performed by thermal treatment.

12. A porous or fully dense non-oxide ceramics component with an high level of geometrical complexity obtainable by the single step vacuum additive manufacturing process of claim 1, the porous or fully dense non-oxide ceramics component having strictly controlled nano-micro-macro-structure features in terms of grain size, ranging from 50 nm to 5000 micron, grain shape, from equiaxed to columnar, phase distribution, grain boundary purity, full density or porosities lies in the range of 10-90%.

13. The vacuum additive manufacturing process for the production of the complex shape non-oxide ceramics according to claim 3 wherein the ceramic components with microstructure and texture differentiated and optimized for different zones of the part can be obtained modulating the high energy source.

14. The vacuum additive manufacturing process of claim 1, wherein the one or more energy sources is laser or electron beam.

15. The vacuum additive manufacturing process of claim 2, wherein the high performance non-oxide ceramic parts are selected from a group including components in pure silicon carbide, silicon nitride, boron carbide and silicides like $MoSi_2$ and $NbSi_2$ and related composites.

16. The vacuum additive manufacturing process of claim 8, wherein the particles mixed as filler with the metallic particles comprises Si powder.

17. The vacuum additive manufacturing process of claim 9, wherein the particles spheroidized together with the metallic particles comprises Si powder.

18. The vacuum additive manufacturing process according to claim 2, wherein the single step process comprises the following procedure within the production chamber for simultaneously shaping and consolidating:
   1) spreading a thin layer of metallic and non metallic mixed powders on a building platform by a coater blade;
   2) preheating the layer of powder by one or more energy sources;
   3) selective melting of the powder by one or more energy source at high energy;
   4) turning (of the metallic particles) to the molten phase and reacting with non metallic particles powder;
   5) repeating the sequence of steps 1-4 until the complete realization in height of the component according to the CAD design of the ceramic component to be realized;
   6) post-processing.

19. The vacuum additive manufacturing process according to claim 2, wherein the powder metallic particles are made of Si and the powder non metallic ones are made of graphite, oxide and non-oxide ceramic particles.

20. The vacuum additive manufacturing process according to claim 2, wherein the metallic and non metallic mixed powders are spread on a building platform by a coater blade forming a layer having thickness higher than the biggest powder particle size and inferior of 200 micrometer.

* * * * *